Patented July 12, 1932

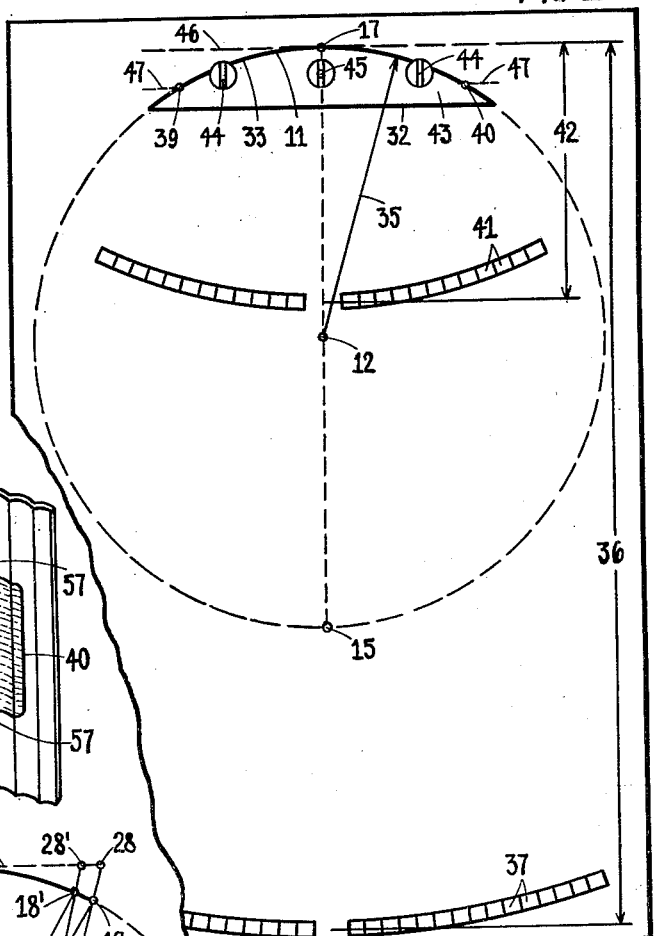
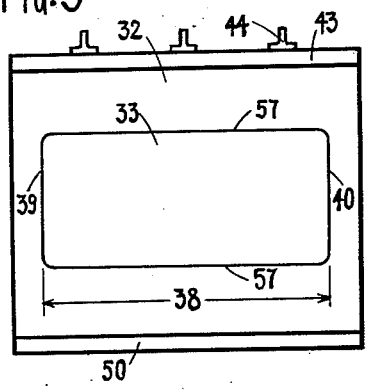
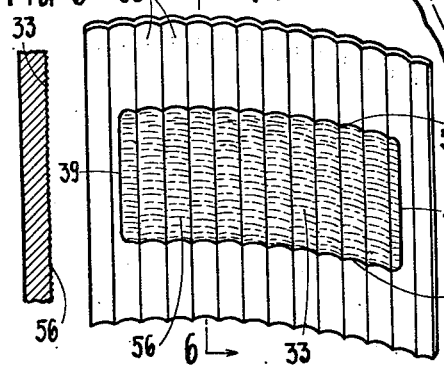
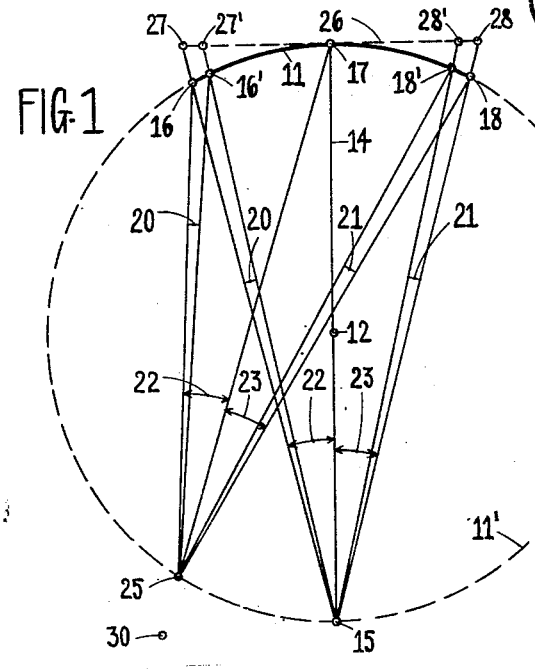
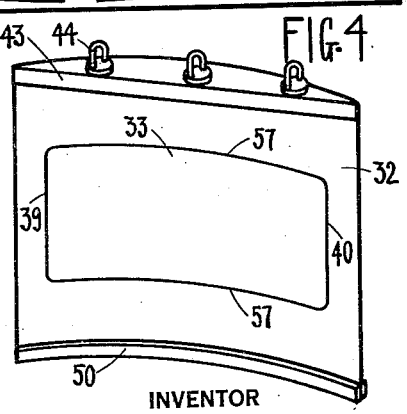

1,867,199

UNITED STATES PATENT OFFICE

ERNEST WILDHABER, OF BROOKLYN, NEW YORK

PROJECTION SCREEN

Application filed March 11, 1930. Serial No. 434,963.

The present invention relates to improvements in projection screens, and especially in projection screens for wide angle projection of moving pictures and still pictures.

One object of the present invention is to devise an improved projection screen which presents equal and undistorted pictures to spectators disposed on a side of the screen as well as to spectators disposed directly in front of the screen.

Another object of the invention is to devise a screen for effecting a panoramic sensation closely related to natural vision.

A further object is to devise a screen of the aforesaid character which is of light construction and of practical form.

A still other aim is to devise a concavely curved screen suited for suspension.

A further object is to devise a curved screen having uniform grooves extending in one general direction.

Other objects will appear in the course of the specification and from recital of the appended claims.

In the accompanying drawing,

Fig. 1 is a diagram explanatory of the present invention.

Fig. 2 is a diagrammatic plan view of a screen constructed in accordance with the present invention, and of its relation with a projection room.

Fig. 3 is a front elevational view corresponding to Fig. 2.

Fig. 4 is a perspective view of a projection screen.

Fig. 5 is a perspective view of a preferred form of screen surface, with the minute surface structure shown exaggerated.

Fig. 6 is an enlarged partial section along lines 6—6 of Fig. 5.

In diagram Fig. 1, which is a plan view similar to Fig. 2, numeral 11 denotes a concave profile of a diffusing surface or projection surface of a screen. Profile 11 is a circular arc centered at point 12.

Profile 11 intersects center line 14 in a point 17, and the elongation 11' shown in dotted lines intersects center line 14 in a further point 15. The radius of profile 11 is preferably so selected that point 15 is inside of the projection hall and that it constitutes a mean point of the spectator area.

A spectator looking from point 15 to the diffusing surface 11 will see a projected picture in certain angular proportions.

To point out some of the said angular proportions, rays are indicated between points 16, 16', 17, 18', 18 of screen profile 11 and point 15. A spectator disposed at point 15 sees the distance 16—16' under a certain angle 20, the distance 18—18' under an angle 21, and the distances 16—17 and 17—18 under angles 22 and 23 respectively.

A screen surface having a profile 11 as indicated presents the projected pictures in exactly the same angular proportions also to spectators disposed on the side of center line 14, for instance to a spectator disposed at point 25, as will now be demonstrated. Point 25 is assumed also on circle 11'.

Rays are drawn, which connect point 25 with the aforesaid points 16, 16', 17, 18', 18.

It is a well known geometrical quality of the circle, that the angles between the rays drawn through any point (25) of its periphery to other points (16, 16' etc.) of its periphery are exactly identical with the angles of the rays drawn through another point (15) of its periphery to the same points (16, 16' etc.). Accordingly the angles 20, 21, 22, 23 observed from point 25 are exactly equal to the corresponding angles observed from point 15. And so are all other corresponding angles. In other words a spectator disposed at point 25 sees a picture in the same manner, in exactly the same proportion as a spectator disposed at point 15. Any distance (16—16', or 16—17 etc.) appears under the same angle to said spectators.

For comparison the effect of a plane or flat screen will now be considered. The straight profile of such a screen is indicated as a dotted line 26. Points 27, 28 are marked on line 26 at equal distances from central point 17. Equal distances 27—27' and 28—28' are evidently observed under equal angles from point 15. Likewise distances 27—17 and 17—28 are observed under equal angles from point 15.

These conditions are altogether changed when the projected picture is viewed by a spectator disposed at point 25. The nearer distances appear under larger angles. So the angle at which distance 27—27' appears from point 25 is larger than the angle at which distance 28—28' is observed. And the angle 27—25—17 of distance 27—17 is larger than the angle 17—25—28 of distance 17—28. In other words the picture presented by a plane screen to a spectator on the side differs in relative proportions from the picture presented to a central spectator. This condition is not remedied in other points disposed on the side. If the picture projected to a plane screen is viewed for instance from a point such as 30, it is seen with substantially the same distortion as from point 25.

Briefly, plane screens present distorted pictures to spectators disposed on the side. And certain concavely curved screens succeed in eliminating said distortion, particularly when the general proportions here given and pointed out in the claims are observed.

Preferably projection is made in such manner that a most natural vision is observed from point 15.

This may be accomplished when the proportion of the focal length of the picture camera divided by the length of the pictures taken is equal to the proportion of distance 15—17 divided by the length of the projection surface.

The projection surface may be made a spherical surface, but for practical reasons cylindrical surfaces are preferred. Preferably the projection surface is a cylindrical surface having a concave circular profile in a horizontal plane and a straight profile in a vertical plane.

I do however not want to limit my invention to cylindrical surfaces nor to circular profiles.

In characterizing the shape of a projection surface or diffusion surface it is understood that the general shape is referred to, and not its minute aspect, unless the latter is specifically recited. The latter is so chosen as to furnish a most suitable diffusion. Also I may employ screens consisting of several layers, if so desired, and still speak of a diffusing surface.

Referring now to Figures 2–6, numeral 32 denotes a projection screen having a diffusing surface 33, inside of which the projected pictures appear. Diffusing surface 33 is a cylindrical surface having a circular profile 11 in a horizontal plane, and extending along straight lines in a vertical plane. Numeral 12 denotes the center of profile 11, and the axis of said cylindrical surface. Radius 35 of diffusing surface 33 is less than one half of the distance 36 between the screen center and the extreme spectator seats 37, of which the last row and the first row are indicated. In general the said extreme spectator seats are disposed on a balcony. Preferably radius 35 is between one quarter and one third of distance 36.

Radius 35 is smaller than twice the length 38 of the diffusing surface 33, and is preferably made nearly equal to said length. The curvature of profile 11 is intense enough that the ends 39, 40 of diffusing surface 33 include an angle of at least thirty degrees with each other, preferably more than forty-five degrees.

Screen 32 stands back from the nearest spectator seats 41 a distance 42 which is preferably larger than one half of radius 35. The latter may be referred to as the curvature radius at the central point (17) of the concave profile (11) of the diffusing surface, to include profiles which depart from a circle on the sides.

Screen 32 is of light construction. Its form is maintained by a beam 43, which contains loops 44 secured to it, for suspending the screen unit. The center of gravity 45 of the screen unit is disposed between the tangential plane 46 at central point 17 and a plane 47 laid through the ends 39, 40 of the diffusing surface. If so desired weights 50 may be disposed at the lower end of screen 32. The weights are preferably so disposed that they exert a uniform tension at all points of the screen proper. The latter may be made of conventional materials and detail structure if so desired.

Screen 32 is raised slightly over the level of the orchestra, as is conventional practice.

Pictures are projected to screen 32 from a point disposed in front thereof. Preferably this point is disposed at a distance therefrom which exceeds radius 35 by at least twenty percent. For instance pictures may be projected from point 15, whose distance from the screen equals twice said radius.

A preferred structure of the surface elements is pointed out in Fig. 5. The screen surface contains equal grooves 55 of curved and uniform profile. Said grooves or corrugations extend all in one general direction, namely in the illustrated instance along the straight line elements of the cylindrical screen surface 33. The grooves are spaced in actuality at much finer distances from each other than indicated in Fig. 5. They are invisible or almost invisible to spectators, and for this reason are omitted in the other figures.

The element containing surface 33 may be made of a sheet or sheet of metal, for instance of an aluminium alloy.

The grooves 55 in combination with the curvature of the general screen surface give an increased lighting efficiency, by confining diffusion laterally to a predetermined range and by giving a more uniform diffusion inside of said range.

Diffusion in vertical direction may be obtained by providing a system of still finer grooves 56 (see Fig. 6) which extend across grooves 55 in a general horizontal direction, that is to say parallel to the sides 57 of surface 33, and which are indicated in dotted lines in Fig. 5. Grooves 56 do not need to be as uniform as grooves 55, and may be made in the nature of scratches.

To prevent oxidation of the metal surface (33), the latter is protected with a thin coat of transparent material.

It is understood that the above description illustrates my invention by way of an example, and that it is not confined to this example. So for instance I may devise many other known or obvious ways of maintaining the shape of the projection surface.

Various modifications may be made in my invention without departing from its spirit. For definition of its scope it is relied on the appended claims.

What I claim is:

1. A screen for moving picture theatres having a diffusing surface concavely curved at least in horizontal direction, the curvature radius at the center of a horizontal profile of said surface being less than one half and more than one quarter of the distance between the screen center and the extreme spectator seats, and the length and height of said diffusing surface having a proportion larger than one and a half to one, (1½:1).

2. A screen for moving picture theatres having a diffusing surface concavely curved in a horizontal plane and straight in a vertical plane, the curvature radius at the center of a horizontal profile of said surface being less than one half and more than one quarter of the distance between the screen center and the extreme spectator seats, and the length and height of said diffusing surface having a proportion larger than one and a half to one, (1½:1).

3. A screen for moving picture theatres having a diffusing surface of concave cylindrical form, a horizontal profile of said surface being substantially circular and having a radius between one half and one quarter of the distance between the screen center and the extreme spectator seats.

4. A projection screen of concave and substantially cylindrical shape, containing wave like corrugations of curved and constant profile, said corrugations extending in one general direction, and their elemental portions being fully reflective like portions of a mirror.

5. A projection screen of concave and substantially cylindrical shape, containing wave like corrugations of curved profile, said corrugations extending in a general direction parallel to the straight line elements of said cylindrical shape, and their elemental portions being fully reflective like portions of a mirror.

6. A projection screen being concavely curved at least in horizontal direction, containing a system of wave like corrugations extending in substantially vertical direction, and a system of finer corrugations extending over the first said corrugations in a general direction at right angles thereto.

7. A projection screen of concave and substantially cylindrical shape, containing a system of wave like corrugations of curved and constant profile extending along the straight line elements of said cylindrical shape, and another system of finer corrugations extending over the firt said corrugations in a general direction at right angles thereto.

ERNEST WILDHABER.